United States Patent [19]

Endo

[11] Patent Number: 4,518,971

[45] Date of Patent: May 21, 1985

[54] THERMAL HEAD

[75] Inventor: Takafumi Endo, Osaka, Japan

[73] Assignee: Mitsubishi Denki Kabushiki Kaisha, Tokyo, Japan

[21] Appl. No.: 563,750

[22] Filed: Dec. 21, 1983

[30] Foreign Application Priority Data

Dec. 29, 1982 [JP] Japan .............................. 57-229804

[51] Int. Cl.³ .............................................. G01D 15/10

[52] U.S. Cl. .............................. 346/76 PH; 400/120; 219/216

[58] Field of Search ........................ 346/76 PH, 76 R; 400/120; 219/216 PH

[56] References Cited

U.S. PATENT DOCUMENTS

| | | | |
|---|---|---|---|
| 3,984,844 | 10/1976 | Tanno et al. | 346/76 R |
| 4,360,818 | 11/1982 | Moriguchi et al. | 346/76 PH |
| 4,389,935 | 6/1983 | Arai | 346/76 PH |
| 4,395,146 | 7/1983 | Arai | 346/76 PH |
| 4,415,904 | 11/1983 | Inui et al. | 346/76 PH |

*Primary Examiner*—E. A. Goldberg
*Assistant Examiner*—A. Evans
*Attorney, Agent, or Firm*—Birch, Stewart, Kolasch & Birch

[57] ABSTRACT

A thermal head includes a heating resistor group which consists of 2n pieces of strip-like heating elements, n pieces of buffer elements for driving the heating elements, wherein the heating elements are adjacently paired for one buffer element so as to enable one of the paired heating elements to be energized, a first common electrode and a second common electrode for energizing the heating elements through the buffer elements, wherein the heating elements are adjacently paired for being connected to the first and second electrodes alternately, a 2n-bit shift register for storing printing data for the heating resistor group, n pieces of multiplexors for selecting one of the 2n-bit signals which are adjacently located in the parallel outputs of the shift register according to the output timing of the first and the second common electrodes, thereby applying the selected signal to the buffer elements.

2 Claims, 4 Drawing Figures

THERMAL HEAD

BACKGROUND OF THE INVENTION

The present invention relates to a thermal head for use in recording data, and more particularly, to a driving IC circuit mounted thereon.

As data recording apparatus various types of thermal heads are known and widely used, among which is a type in which a heating resistor group, a transistor array and a shift register are provided. The heating resistor group consists of 2n pieces of heating elements, which are adjacently paired for making connections to two common electrodes alternately. The transistor array consists of n pieces of transistors, against which the heating elements are also adjacently paired for being connected to the individual transistors. Each transistor is connected to the shift register so as to receive signals therefrom. In this arrangement, when the heating elements are to be selectively driven, a voltage is applied to either of the two common electrodes, thereby energizing one group of the heating elements connected thereto. Then, a voltage is applied to the other common electrode, thereby energizing the remaining heating elements. At each time signals must be transferred to the shift register, because the transistor array only act as buffers for switching the heating elements. As evident from the foregoing description, this known type of thermal head has a disadvantage that the printing data must be transferred to the shift register one portion after another. Another disadvantage is that it is impossible to transfer printing data in the positional order of the heating elements. This type will be explained in detail below.

Another prior art thermal head is disclosed in U.S. Pat. No. 3,984,844, which is characterized by a plurality of electrodes arranged alternately on both sides of a strip-like region of an insulated substrate, with a plurality of heating resistor elements bridging the electrodes. In this arrangement a voltage is selectively applied to the electrodes on one side of the strip-like region and those adjacent thereto on the other side of the region, thereby energizing the heating resistor elements. In this way a visual recording of data is effected due to the heat generated by the particular heating resistor elements. However, the shift register provided in the driving circuit is only for storing n-bit signals corresponding to the 2n pieces of heating resistor elements. As pointed out with respect to the first-mentioned prior art thermal head, the printing data must be transferred to the shift register one portion after another, and it is also impossible to transfer the printing data in the positional order of the heating resistor elements. If it is to be achieved, the circuit will become extremely complicated.

SUMMARY AND OBJECTS OF THE INVENTION

The present invention is directed toward solving the difficulties and problems pointed out with respect to the known thermal heads, and has for its object to provide an improved thermal head capable of transferring the printing data at one time. Another object of the present invention is to provide an improved thermal head capable of transferring the printing data in the positional order of the heating resistor elements.

Other objects, features and advantages of the present invention will become more apparent from the following description when taken in connection with the accompanying drawings, which show, for the purpose of illustration only, a thermal head embodying the present invention.

According to one advantageous aspect of the present invention, there is provided a thermal head which comprises a heating resistor group including 2n pieces of strip-like heating elements, n peices of buffer elements for driving said heating elements, wherein said heating elements are adjacently paired for one said buffer element so as to enable one of said paired heating elements to be energized, a first common electrode and a second common electrode for energizing said heating elements through said buffer elements, wherein said heating elements are adjacently paired for being connected to said first and second electrodes alternately, a 2n-bit shift register for storing printing data for said heating resistor group, n pieces of multiplexors for selecting one of the 2n-bit signals which are adjacently located in the parallel outputs of said shift register according to the output timing of said first and second common electrodes, thereby applying said selected signal to said buffer elements.

DETAILED DESCRIPTION OF THE INVENTION

Figure 1:
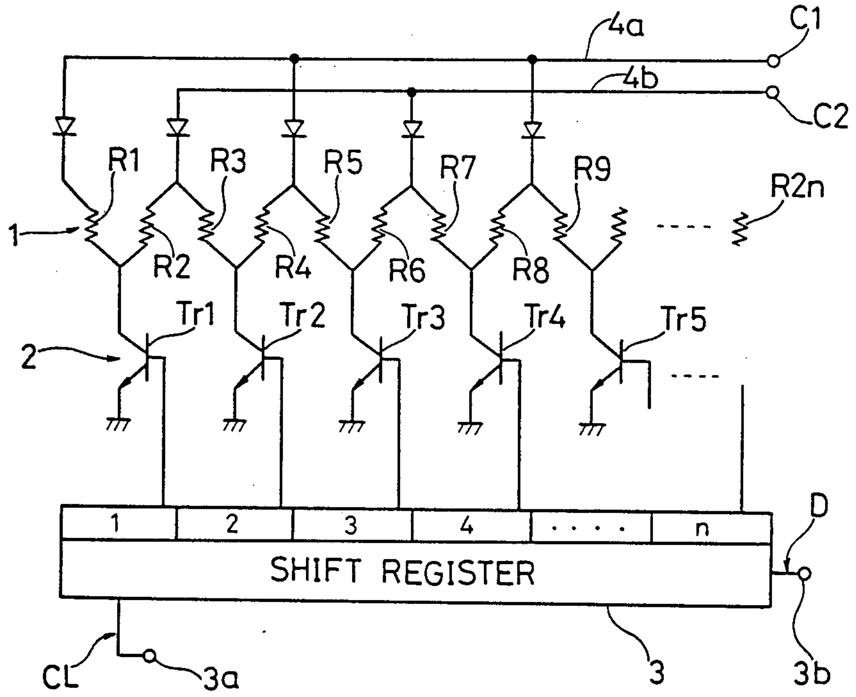
FIG.1 (PRIOR ART)
FIG. 1 is a circuit diagram showing one example of prior art thermal head.
Figure 2:
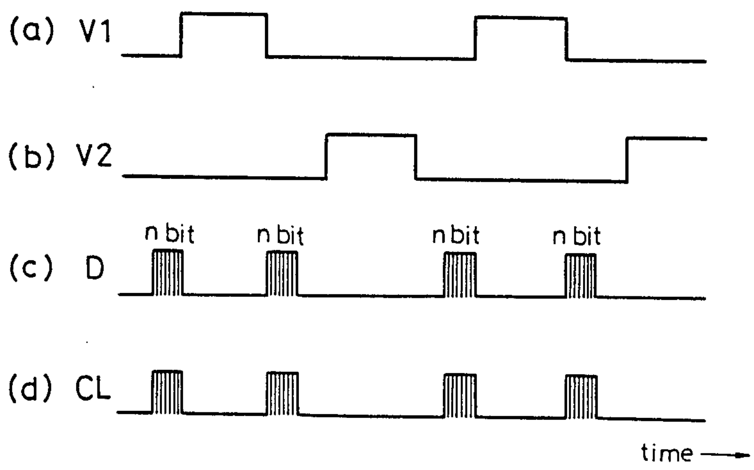
FIG.2 (PRIOR ART)
FIG. 2 is an input timing chart exemplifying the operation of the thermal head of FIG. 1.

In order to explain the background of the present invention, reference will be more particularly made to a thermal head known in the art, shown in FIGS. 1 and 2. In FIG. 1 there is provided a heating resistor group 1, which consists of a plurality of strip-like heating elements R1, R2, . . . , R2n totalling 2n pieces. The heating resistor group 1 is connected to a shift register 3 with a transistor array 2 being interposed therebetween. The transistor array 2 consists of a plurality of transistors Tr1, Tr2, . . . , Trn totalling n pieces, which means a half of the number of the heating elements. The heating resistor group 1 is connected to two lead electrodes, that is, a first electrode 4*a* and a second electrode 4*b*. To make connections to the two electrodes 4*a*, 4*b*, the individual heating elements R1, R2, R3, . . . , R2n are grouped into two parts, in which each adjacent two heating elements are paired for being connected to either of the lead electrodes 4*a*, 4*b*. In the illustrated example, the heating element R1 is connected to the first electrode 4*a*, and the paired heating elements R2 and R3 are connected to the second electrode 4*b*. The next paired heating elements R4 and R5 are connected to the first electrode 4*a*. In this way except for the heating element R1, each adjacent two heating elements in pair are connected alternately to the first electrode 4*a* and the second electrode 4*b*, which have terminals C1 and C2, respectively. The shift register 3 is designed to logically switch the transistor array 2. FIG. 2 shows an input timing chart obtained when the termal head shown in FIG. 1 is operated.

Under the arrangement mentioned above, when the heating resistor group 1 is to be selectively driven, an adequate voltage V1 is impressed on the terminal C1 of the first electrode 4*a* thereby energizing the heating elements R1, R4, R5, R8, R9 . . . . Prior to impressing the voltage V1, the shift register 3 receives a data signal D given at its data input 3*b*, which is synchronous with a clock signal CL given at its clock input 3*a*, as shown in FIG. 2 (*a*), (*c*) and (*d*). In this way when the voltage V1 is impressed, the shift register 3 holds n bit serial signals, wherein either "1" or "0" is output from the n bit parallel outputs.

Subsequently, a voltage V2 is impressed on the terminal C2 of the second electrode 4*b*, thereby energizing the heating elements R2, R3, R6, R7, . . . . At this stage, the shift register 3 has received a data signal D given at its data input 3*b*, which is synchronous with a clock signal CL given at its clock input 3*b*. In this way the shift register 3 receives new n bit serial signals transferred. The transistor array 2 acts as a buffer to switch the heating resistor group 1.

Under the conventional system described above, when the heating resistor is driven, printing data must be transferred to the shift register 3 one portion after another, which means that the data transfer must happen twice. Moreover, it is impossible to transfer the printing data in the positional order of the heating elements R1, R2, . . . , R2n. If it is to be achieved, the circuit will inevitably become complicated.

Figure 3:
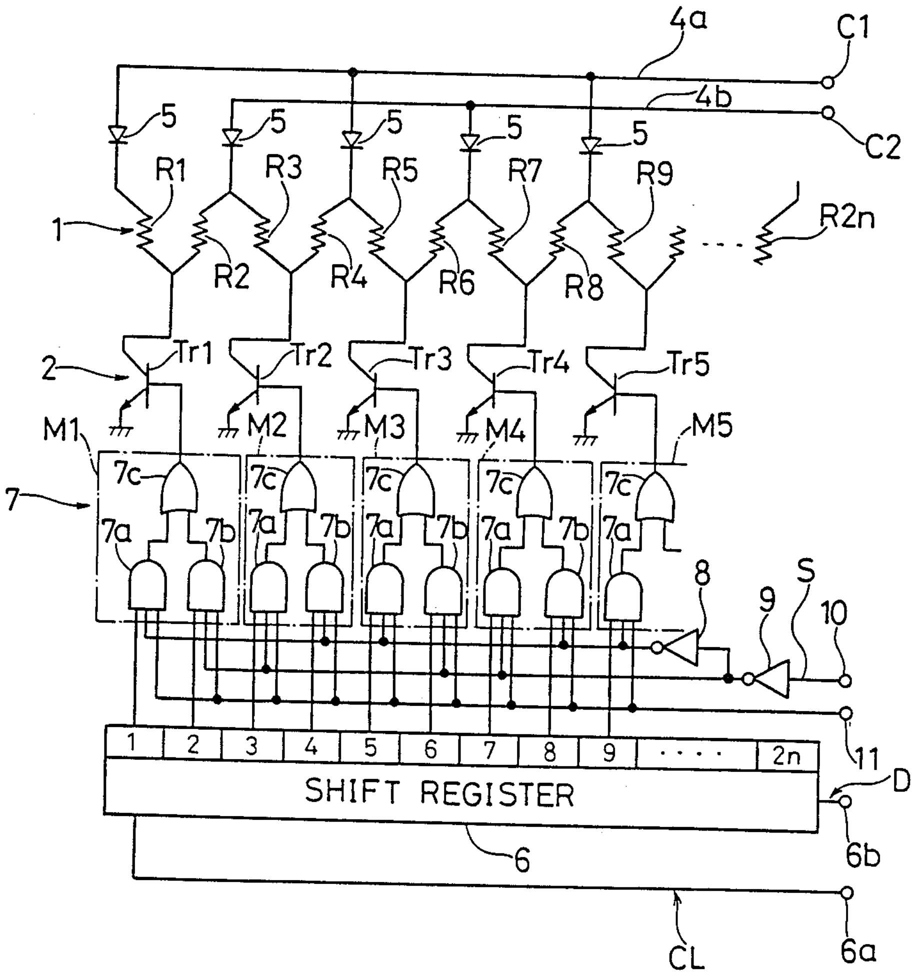
FIG. 3 is a circuit diagram showing a thermal head embodying the present invention.
Figure 4:
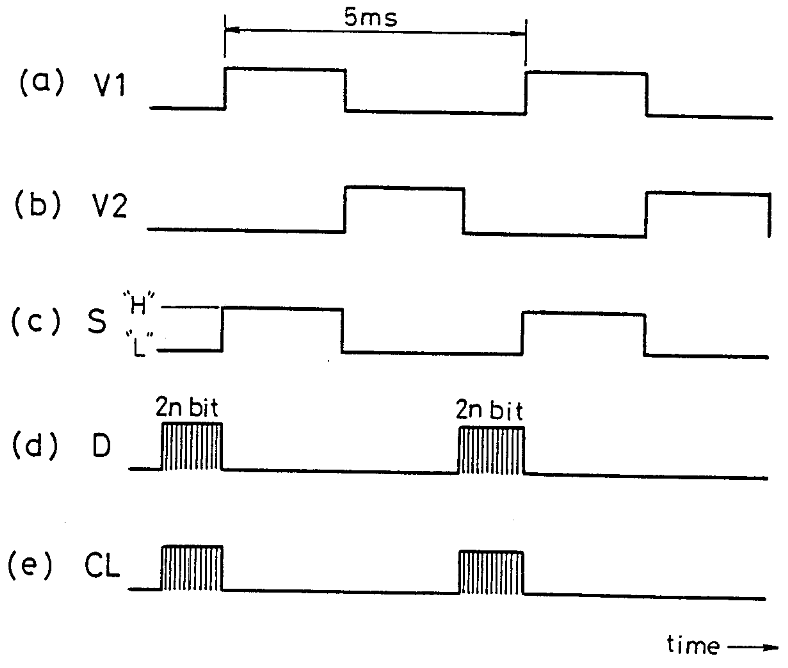
FIG. 4 is an input timing chart exemplifying the operation of the thermal head of FIG. 3.

Referring now to FIGS. 3 and 4, a thermal head of the present invention will be described:

There is provided a heating resistor group 1, which consists of a plurality of strip-like heating elements R1, R2, R3, . . . , R2n, totalling 2n pieces. The heating resistor group 1 is connected to two common lead electrodes 4*a*, 4*b*, wherein the heating element R1 is connected to the first common lead electrode 4*a*. The remaining heating elements are adjacently paired for being connected alternately to the first electrode 4*a* and the second electrode 4*b*. The reference numeral 2 designates a transistor array, which consists of n pieces of transistors Tr1, Tr2, . . . acting as buffers for driving the heating elements R1, R2, . . . which are adjacently paired with respect to the individual transistors Tr1, Tr2, . . . . More concretely, the heating elements R1 and R2 are paired for making connections to the first transistor Tr1, and the heating elements R3 and R4 are paired for the second transistor Tr2. In this way the heating elements are adjacently paired with respect to the individual transistors Tr1, Tr2, . . . . The first common lead electrode 4*a* and the second common lead electrode 4*b* have terminals C1 and C2 respectively, across which voltages V1 and V2 are impressed at different time. The reference numeral 5 designates valve diodes for allowing a current to pass only in the forward direction. The reference numeral 6 designates a 2n-bit shift register, which can store printing data for the heating resistor group 1. The shift register 6 has a clock input 6*a* and a data input 6*b*. The reference numeral 7 designates a multiplexor array, which consists of n pieces of multiplexors M1, M2, . . . , each being adapted to select one from the two outputs in pair when parallel outputs are generated from the shift register 6, whereby the transistors Tr1, Tr2, . . . are individually switched. The multiplexor array 7 receives a select signal S from a select terminal 10 and an all-off signal from an all-off terminal 11 which is normally high ("H"), and low ("L") in the all-off operation.

Each multiplexor M1, M2, . . . of the multiplexor array 7 comprises a first AND circiut 7*a*, a second AND circuit 7*b* and an OR circuit 7*c*. The first AND circuit 7*a* receives as an input the first bit-signal in the adjacently located 2 bit signals in the parallel outputs of the shift register 6 and a signal from an invertor 8 or 9 which signal is a voltage output timing signal of the common lead electrode 4*a* or 4*b* connected to the particular heating element corresponding to the first bit-signal. The second AND circuit 7*b* receives as an input the second bit-signal in the adjacently located 2 bit signals and a signal from the invertor 8 or 9 which signal is a voltage output timing signal of the common lead electrode 4*a* or 4*b* connected to the particular heating element corresponding to the second bit-signal. The both AND circuits 7*a*, 7*b* furthermore receives the all-off signal from the all-off terminal 11 which becomes high except for the all-off operation. The OR circuit 7*c* is adapted to provide an output to the transistors Tr1, Tr2, . . . by OR-operation of the outputs of the two AND circuits 7*a* and 7*b*.

An example of the operation of the thermal head described above will be explained with reference to FIG. 4, which shows a timing chart of the input signals:

When the heating resistor group 1 is to be heated, a 2n-bit data signal D is applied, as shown in FIG. 4 (*d*) and (*e*), to the data input 6*b* of the shift register 6 synchronously with the clock signal CL applied to the clock input 6*a* thereof, thereby transferring printing data to the shift register 6 in the positional order of the heating elements R1, R2, . . . , R2n. Subsequently, as shown in FIG. 4 (*a*), a voltage V1 is impressed on the terminal C1 of the first common lead electrode 4*a*, wherein the heating elements R1, R4, R5, R8, R9, . . . are selected. At this stage, by applying a select signal S of "H" to the select terminal 10 as shown in FIG. 4 (*c*), the first bit, the fourth bit, the fifth bit, the eighth bit, the nineth bit . . . are selected from the parallel outputs of the shift register 6 owing to the fact that the first and second AND circuits 7*a*, 7*b* are made open and closed respectively in the first, third, fifth . . . multiplexors M1, M3, M5 . . . and that the first and second AND circuits 7*a*, 7*b* are made closed and open respectively in the second, fourth . . . multiplexors M2, M4 . . . . In this way, in correspondence to signal "1" or "0" of each bit output which passed through the first or second AND circuit 7*a*, 7*b* and the OR circuit 7*c*, the transistors Tr1, Tr2, Tr3, Tr4, Tr5 are selectively driven and the heating elements R1, R4, R5, R8, R9, . . . are selectively heated.

As shown in FIG. 4 (*b*) a voltage V2 is applied to the terminal C2 of the second common lead electrode 4*b*, wherein the heating elements R2, R3, R6, R7, . . . are selected. At this stage, by switching the signal "H" of the select terminal 10 to a signal "L", the second bit, the third bit, the sixth bit, the seventh bit . . . are selected from the parallel outputs of the shift register 6 owing to the fact that the first and second AND circuits 7*a*, 7*b* are made closed and open respectively in the first, third, fifth . . . multiplexors M1, M3, M5 . . . and that the first and second AND circuits 7*a*, 7*b* are made open and closed respectively in the second, fourth . . . multiplexors M2, M4 . . . . In correspondence to signal "1" or "0" of each bit output which passed through the first or second AND circuits 7*a*, 7*b* and the OR circuit 7*c* the heating elements R2, R3, R6, R7 are selectively heated. The series of operation is carried out at time intervals of 5 m sec.

As evident from the foregoing description, the transfer of printing data can be only once unlike the conventional thermal heads in which it must happen twice. In addition, the transfer can happen in the positional order of the heating elements, thereby simplifying the structure of the circiut.

In the structure referred to above, the transistor array 2, the shift register 6, and the multiplexor array 7 are separately located, but they can be provided on the same chip. The all-off function of the multiplexor array 7 can be omitted.

What is claimed is:

1. A thermal head for use in thermally recording data, the thermal head comprising:

a heating resistor group including 2n pieces of heating elements;

n pieces of buffer elements for driving said heating elements, wherein said heating elements are adjacently paired for one said buffer element so as to enable one of said paired heating elements to be energized;

a first common electrode and a second common electrode for energizing said heating elements through said buffer elements, wherein said heating elements are adjacently paired for being connected alternately to said first common electrode and said second common electrode;

a 2n-bit shift register for storing printing data for said heating resistor group; and n pieces of multiplexors each for selecting one of the 2 bit signals adjacently located in the parallel outputs of said shift register according to the output timing of said first common electrode or said second common electrode, thereby applying said selected signal to said buffer elements.

2. A thermal head as set forth in claim 1, wherein each of said mutiplexors comprises a first AND circuit, a second AND circuit and an OR circuit, said first AND circuit receiving as an input the first bit-signal in said adjacently located 2 bit signals in the parallel outputs of said shift register and a voltage output timing signal of said common electrode connected to the particular heating element corresponding to said first bit-signal, said second AND circuit receiving as an input the second bit-signal in said adjacently located 2 bit signals and a voltage output timing signal of said common electrode connected to the particular heating element corresponding to said second bit-signal, and said OR circuit being adapted to provide an output to said buffer element by OR-operation of the outputs of said two AND circuits.

* * * * *